A. R. GROFF.
AUXILIARY SPRING FOR AUTOMOBILES AND MOTOR DRIVEN VEHICLES.
APPLICATION FILED FEB. 19, 1919.
1,351,105.
Patented Aug. 31, 1920.
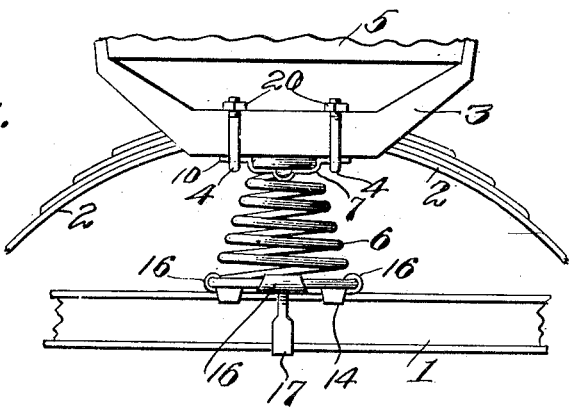
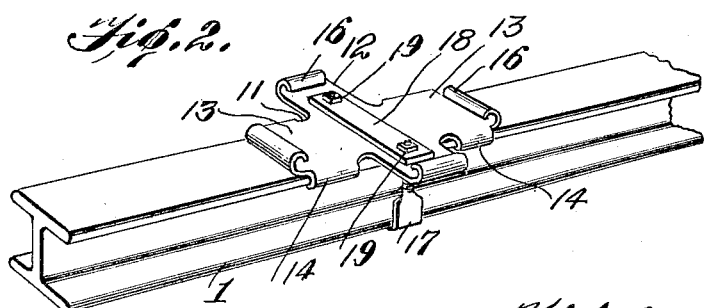
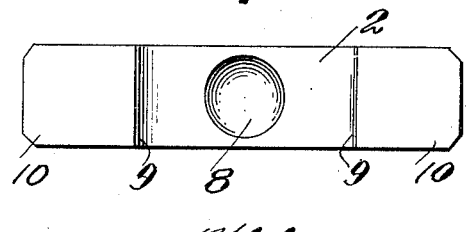
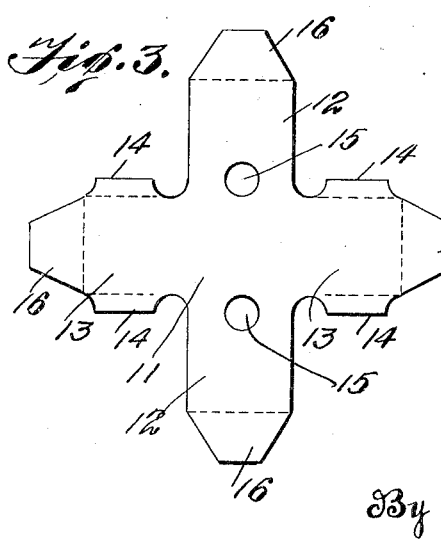
Inventor
Angus R. Groff.
By
Attorney

UNITED STATES PATENT OFFICE.

ANGUS R. GROFF, OF BIRMINGHAM, ALABAMA, ASSIGNOR TO A. R. G. AUXILIARY SPRING COMPANY, OF BIRMINGHAM, ALABAMA, A CORPORATION OF ALABAMA.

AUXILIARY SPRING FOR AUTOMOBILES AND MOTOR-DRIVEN VEHICLES.

1,351,105.   Specification of Letters Patent.   Patented Aug. 31, 1920.

Application filed February 19, 1919. Serial No. 277,999.

*To all whom it may concern:*

Be it known that I, ANGUS R. GROFF, a citizen of the United States of America, residing at Birmingham, in the county of Jefferson and State of Alabama, have invented certain new and useful Improvements in Auxiliary Springs for Automobiles and Motor-Driven Vehicles, of which the following is a specification.

This invention relates to an auxiliary spring for automobiles and motor driven vehicles which is simple in construction, readily attached and which will operate both to protect the main springs from fracture whether caused by overloading the latter or by the downward or upward movements of the car body as a result of jolts due to inequalities in the road.

More particularly my invention is adapted for use on cars equipped with a transverse main leaf spring overlying the axle, such for instance, as the present arrangement of the springs on Ford automobiles.

A further object is to design very simple and inexpensive means for attaching the spring overhead to the body engaging clips of the main spring and below to the axle or equivalent element on the running gear.

My invention also involves the novel details of construction and arrangements of parts, which in their preferred embodiments only are illustrated in the accompanying drawings, which form a part of this specification, and in which:—

Figure 1 is a front view broken away of an automobile spring and axle with my auxiliary spring attached, and shown in front elevation.

Fig. 2 is a perspective view of the base plate mounted on a front axle.

Fig. 3 is a plan view of the blank from which the base plate is formed.

Figs. 4 and 5 are plan and side views respectively of the top plate which secures the auxiliary spring overhead and main spring clips.

Similar reference numerals refer to similar parts throughout the drawings.

As illustrated in the drawings, 1 represents the front axle of a Ford automobile which is typical of any automobile equipped with a transverse leaf spring 2 above the axle, this spring being secured at its center to the channel member 3 by means of U-bolt clips 4, and the member 3 being attached to the car body 5 in any suitable manner.

As illustrated, the front axle 1 has a section similar to an I-beam and between the axle and the center of the spring 2 I interpose a conical coiled spring 6 having inserted between its two upper coils a transverse top plate 7 which has a central semi-globular boss 8 pressed therein and on each side of the boss is formed a raised shoulder 9, between which shoulders the top coil is adapted to be embraced and to seat on the depressed center of the plate. The raised ends 10 of the plate project sufficiently on each side to be inserted under the U-bolt clips 4 after the latter have been loosened and by tightening up these clips the top plate is held firmly and rigidly in position The shoulders 9 and the boss 8 will prevent the disengagement of the spring from, or its displacement relatively to, the plate 7 and the top end of the spring is, by means described, made fast to the car body.

I provide a base plate for the spring which is more clearly illustrated in Figs. 2 and 3 and is formed from a metal blank 11 having four equi-distantly spaced extensions 12 and 13, the extensions 12 being oppositely disposed and similar to each other, and the extensions 13 being oppositely disposed at right angles to the extensions 12 and similar to the latter extensions except that each extension 13 is provided on each side with a lip 14. A pair of bolt holes 15 is provided near the inner ends of the extensions 12 and the tips 16 of the several extensions are tapered and adapted to be bent upwardly to embrace the base coil of the auxiliary spring 6. A clip 17 is passed under the axle 1 and its threaded ends are inserted through the holes 15 and through alining holes in a washer plate 18 and receive nuts 19 by which the clip and plates 11 and 18 are rigidly secured on the axle. After this the lips 14 are bent around the edges of the top flange of the axle, as shown in Fig. 2, thus holding the base plate against twisting and serving to provide a very strong attachment for the outer ends of the extensions 13 to the axle. The strength of the extensions 12 is substantially reinforced by the washer plate 18, which it will be observed overlaps these extensions terminating just far enough from the tips 16 to leave ample seating room for the spring.

Though I have described the construction of the base plate for the purposes of making clear the operation of my invention, I do not in this application claim the detail construction of such base plate.

In operation, the base plate 11 is first mounted in blank form on the axle 1 by which the clip members 17, 18 and 19, after which the lips 14 are bent over by suitable tools to interlock with the axle. The spring 6 is then seated on the base plate and the tips 16 are bent about the spring firmly anchoring it to the base plate. The top plate 7 is inserted between the upper coils of the spring and after loosening U-bolts 4 the ends 10 of the plate 7 are worked under the U-bolts, one end 10 of the plate 7 being slipped under the U-bolt at one side and moved over far enough to permit the other end 10 to be slipped under the other U-bolt 4, after which the center of the plate 7 is brought midway between the U-bolts 4 and the latter are tightened up by means of their nuts 20. When thus assembled the spring 6 has rigid connection both to the body and to the axle and with its shape and characteristics will form a valuable auxiliary spring to protect the main spring 2 and reduce shocks and continually to resist an abnormal tossing of the body which is the most frequent cause of fracture of the leaf spring.

This invention is not intended to be restricted in scope to the specific embodiments shown, but contemplates such modifications as come within the spirit and scope of the claims.

Having thus described my invention, what I claim as new and desire to secure by Letters Patent, is:—

1. The combination with a vehicle body, a supporting spring therefor and spaced connecting elements, of an auxiliary coil spring having a thin attaching plate inserted between its upper coils and engaged and made fast to the body by said spaced connecting elements, and means to attach the base of said auxiliary spring to the vehicle running gear.

2. The combination of a vehicle body, a spring therefor, spaced U-bolts, an auxiliary coil spring, a thin anchor plate inserted between the upper coils of said spring and having its ends bent upwardly and outwardly and inserted under and connected to the body by said U-bolts, a running gear for the vehicle, and means to anchor the base of the spring to said running gear.

3. The combination with a vehicle having an axle and body with a leaf spring attached at its mid-point to the body and at its ends to the axle, of a plate secured to the underside of the vehicle body and provided with a depressed portion, and an auxiliary coiled spring having its lower end attached to said axle and its upper coil secured between the body and said depressed portion of the plate, said depressed member acting to center the upper portion of the coiled spring.

4. The combination with a vehicle having an axle and body with a leaf spring attached at its mid-point to the body and at its ends to the axle, of a plate secured to the underside of the vehicle body and provided with a depressed portion having a depressed semi-spherical member, and an auxiliary coiled spring having its lower end attached to said axle and its upper coil secured between the body and said depressed portion of the plate, said depressed member acting to center the upper portion of the coiled spring.

5. A narrow plate for securing a coiled spring to a vehicle including a depressed portion adapted to receive a coil of the spring and hold the same in engagement with the vehicle, lateral wings extending beyond the depressed portion and adapted to be secured to the vehicle, and a depressed semi-spherical member carried by the depressed portion and adapted to center said spring.

In testimony whereof I affix my signature.

ANGUS R. GROFF.

Witness:
NOMIE WELSH.